United States Patent
Wayman et al.

(10) Patent No.: US 6,796,546 B2
(45) Date of Patent: Sep. 28, 2004

(54) VALVE ASSEMBLY

(75) Inventors: Kevin R. Wayman, Greenwood, IN (US); Drew A. Crafton, Mooresville, IN (US); Joel E. Mowatt, Zionsville, IN (US)

(73) Assignee: General Motors Corporation, Detroit, MI (US)

( * ) Notice: Subject to any disclaimer, the term of this patent is extended or adjusted under 35 U.S.C. 154(b) by 149 days.

(21) Appl. No.: 10/187,273

(22) Filed: Jun. 26, 2002

(65) Prior Publication Data

US 2004/0000658 A1 Jan. 1, 2004

(51) Int. Cl.[7] .................................................. F16K 3/26
(52) U.S. Cl. ........................................................ 251/321
(58) Field of Search ................................ 251/321, 120; 137/625.65, 625.69

(56) References Cited

U.S. PATENT DOCUMENTS

| | | | | |
|---|---|---|---|---|
| 4,244,389 A | * | 1/1981 | Shimoura et al. ....... | 251/120 X |
| 4,546,786 A | * | 10/1985 | Koike ..................... | 137/115.08 |
| 5,014,747 A | * | 5/1991 | Suzuki et al. .......... | 137/625.65 |
| 5,513,673 A | * | 5/1996 | Slavin et al. .......... | 137/625.65 |
| 6,053,089 A | * | 4/2000 | Totsuka et al. ........ | 91/368 |
| 6,435,213 B2 | * | 8/2002 | Lou ........................ | 137/625.65 |

* cited by examiner

Primary Examiner—Eric Keasel
(74) Attorney, Agent, or Firm—Leslie C. Hodges

(57) ABSTRACT

A valve assembly has a valve body with a bore formed therein. A valve spool is slidably disposed in the valve body. The valve spool has a plurality of valve lands that closely engage the valve bore to form substantially leak-free interfaces. The leading land has a diameter less than the land immediately adjacent thereto in a range of 0.34 mm to 0.17 mm, and a recess formed between the leading land and the first adjacent land. The recess has an inner diameter at least 0.75 mm less than said diameter of said leading land.

3 Claims, 2 Drawing Sheets

VALVE ASSEMBLY

TECHNICAL FIELD

This invention relates to valve assemblies and, more particularly, to spool-type valve assemblies having a plurality of valve lands slidably disposed in a valve bore.

BACKGROUND OF THE INVENTION

Spool valve assemblies are generally comprised of a slidable valve spool, a valve bore and a control spring or bias spring. The valve spool has a plurality of lands which are disposed slidably within the valve bore and in sufficiently close tolerance to inhibit leakage past the valve land while controlling fluid flow between fluid ports connected with the valve bore. The valve spool generally has a leading valve land, which inserts into the bore first during assembly and is susceptible to burrs and other damage during handling if proper handling precautions are not employed. A burr on the leading edge can disturb the valve operation as well as disturb the clearance between the valve bore and the valve land by scratching or otherwise marring the valve bore during forced insertion by an operator or assembler. Also, a slight nick or burr on the leading valve land can result in misoperation of the valve and that the return spring does not have sufficient force to move the valve to the proper location within the valve bore when the control pressures are not existent.

This problem is generally disclosed or found by misoperation or nonoperation of the device controlled by the valve spool or valve assembly. Generally, this misoperation is sensed in the inadequate exhausting of a fluid clutch or brake in a transmission or the inability of a clutch or brake to be applied. Also, if the valve is a pressure regulating-type valve, the improper regulating pressure may be present within the system due to the marring of the leading edge of the valve.

SUMMARY OF THE INVENTION

It is an object of the present invention to provide an improved valve assembly wherein the valve spool has a leading edge, which is sufficiently small to not contact the valve bore during assembly.

In one aspect of the present invention, the leading end of the valve spool has a bore that is slightly smaller in diameter than the leading edge of the control portion of the valve spool found on the first land.

In another aspect of this present invention, a recess is formed between the leading or pilot end of the valve spool and the leading end of the sealing land such that any debris present at assembly will be dislodged into the recess and exhausted from the valve by fluid flow through the valve.

DESCRIPTION OF THE EXEMPLARY EMBODIMENT

Figure 1:
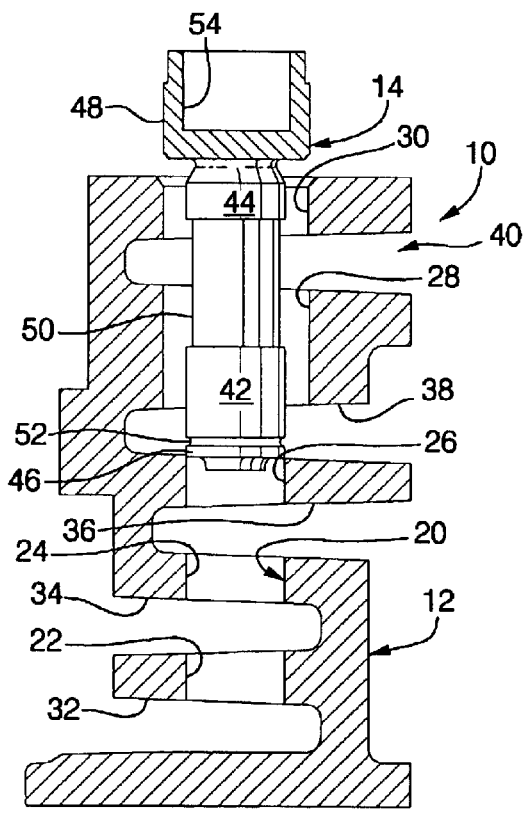
FIG. 1 is an elevational view, partly in section, showing a portion of a valve body in a valve spool in essentially the first stage of assembly.
Figure 2:
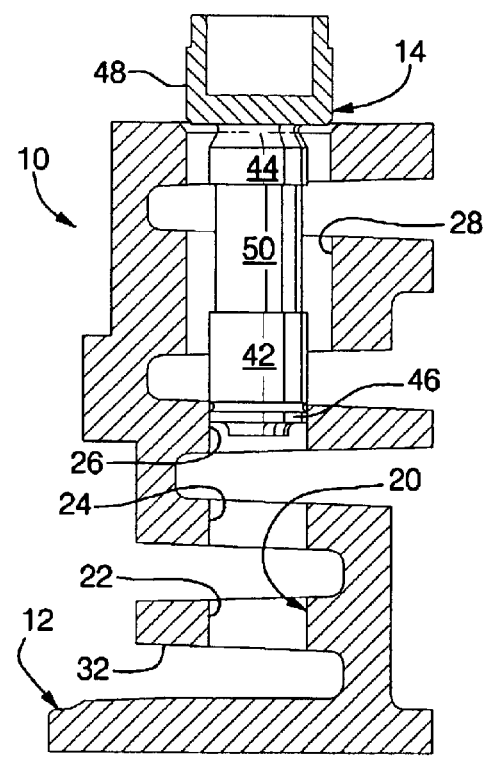
FIG. 2 is a view similar to FIG. 1 wherein the assembly process has been advanced from FIG. 1.
Figure 3:
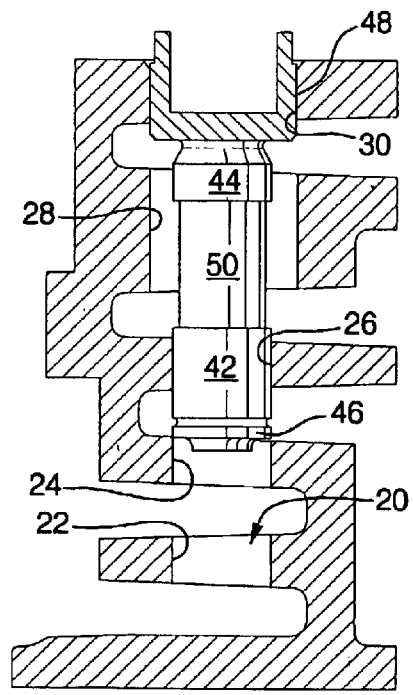
FIGS. 3, 4, and 5 are views similar to FIG. 1, each having a more advanced stage of assembly.
Figure 4:
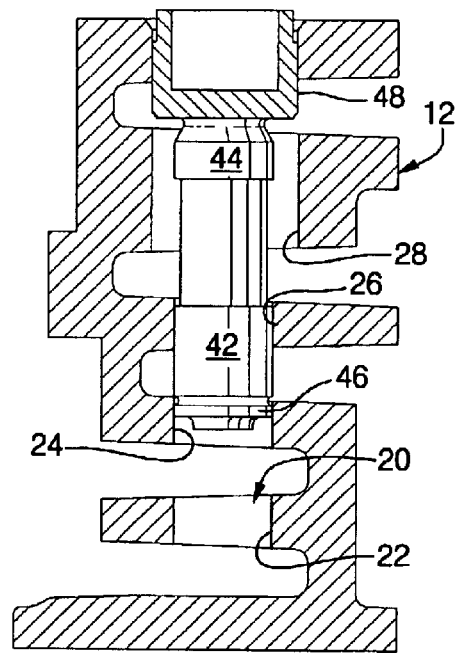
Figure 5:
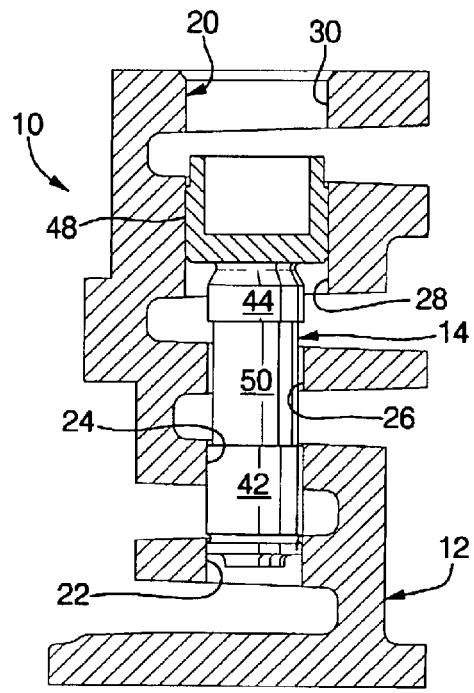

Referring to the drawings, wherein like characters represent the same or corresponding parts throughout the several views, there is seen a valve assembly 10 having a valve body 12, a valve spool 14, a bias or control spring 16, and a spring clip or assembly clip 18. The valve body 12 has a valve bore 20, which includes a plurality of diametral portions 22, 24, 26, 28, and 30. The diameter portions 28 and 30 are larger than the diameter portions 22, 24, and 26. The diameter portion 22 is adjacent a pair of ports 32 and 34. The diameter portion 24 is adjacent the port 34 and a port 36. The diameter portion 26 is adjacent the port 36 and a port 38. The diameter portions 28 and 30 are adjacent an assembly opening 40 through which the assembly clip 18 is inserted.

The valve spool 14 includes a pair of equal diameter spaced lands 42 and 44, a protection or leading pilot land 46, and an enlarged diameter land 48. A valley portion 50 separates the lands 42 and 44, and a recess 52 separates the lands 46 and 42. The large diameter land 48 has a spring pocket 54 formed therein. The control spring 16 is inserted into the spring pocket 54 through an end opening 56 of the valve assembly 10. Following the insertion of the valve spool 14, the spring 16 is inserted and the spring clip 18 is installed through the opening 40 to complete the assembly of the valve.

The valve body 12 is secured to a separator plate 58, which includes a pair of passages 60 and 62, which communicate with the ports 36 and 38, respectively. The pilot or protection land 46 is smaller in diameter than the land 42. In a typical valve assembly, the diametral difference between the land 46 and the land 42 is in the range of 0.12 mm to 0.34 mm. The lands 44 and 46 have a sliding sealing fit with the diameters 22, 24, and 26 as is typical with spool valves, such as that shown here. Thus, the pilot or protection land 46 has a significant clearance with these diametral portions of the valve bore 20.

As the valve spool 14 is inserted into the valve bore 20, the pilot or protection land 46 will first encounter the valve diameter portion 26, thereby aligning the valve spool for assembly and this alignment will continue as the valve assembly progresses as shown in FIGS. 2, 3, 4, and 5. The recess 52 is significantly smaller in diameter than the leading land 46. This recess permits any grit or debris which is missed during the valve assembly process to be swept from the leading land 46 into the recess 52. When the valve spool 14 is fully engaged into the valve bore 20, the debris which has collected within the recess 52 will be expelled from the valve through the port 32 and either lodged within the filter of the transmission control system or in the bottom of the transmission sump. In either event, the debris will not be recirculated through the transmission control system.

During the assembly process, it is known that the valve can become marred by being dropped by the assembler or commingled with other valve spools. This quite often results in a burr or metal upset being formed on the leading edge of the valve spool. But for the protection or pilot land 46, the valve land 42 would receive this damage. If the valve land 42 were to be damaged, the upset or burr portion could interfere with the assembly process and/or scratch the inner areas of the diameters 22, 24, and 26. This upset or burr portion would also affect the operation of the valve, particularly if the valve has a low spring force compared to the operating pressures.

The burr formed on the leading edge of the protection land 46, however, will have sufficient clearance during assembly so that the diameter portions 22, 24, and 26 will not be affected thereby. Also, the operation of the valve will not be influenced by slight damage to the leading edge of the protection land 46.

Figure 6:
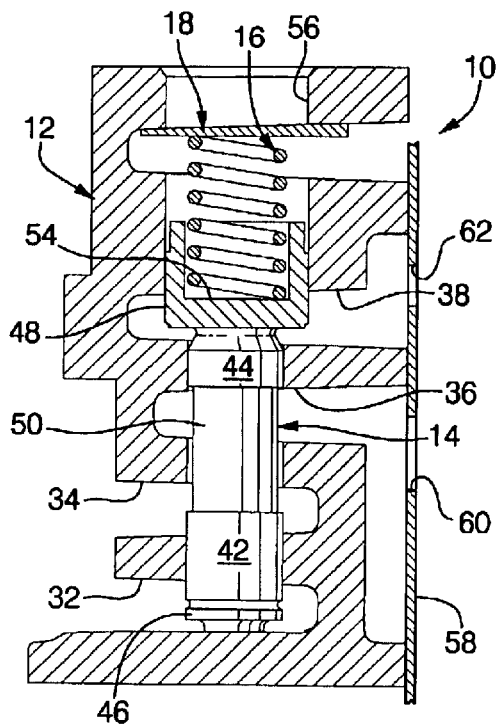
FIG. 6 is a view of the valve assembly fully assembled.

In one example of use, the valve assembly 10 is employed to control fluid flow between a clutch feed passage, not shown, and a clutch engagement passage, not shown. In the assembly shown, the clutch feed passage attaches to the passage 62 and the clutch engagement passage attaches to the passage 60. It is desirable to exhaust the clutch when the clutch operation is not needed within the transmission, and during the exhaust condition, the valve assembly 10 assumes the position shown in FIG. 6.

During clutch disengagement, the fluid in the clutch exhausts through the passage 60 around the valley portion 50 and out an exhaust area at port 34. The pilot land 46 of the valve spool 14 exhausts at the port 32. Thus, there is essentially no pressure operable on the end of valve spool 14 adjacent the pilot land 46.

It is, as is well known, desirable to have the clutch fully disengaged such that improper operation of the transmission will not occur. While not shown in the present description, the ports 34 and 36 can, if desired, be controlled by a low pressure valve, which will maintain the clutch full of oil but at a significantly low pressure which will not affect operation. This is done to provide consistency in electronically-controlled transmissions, as is well known.

Figure 7:
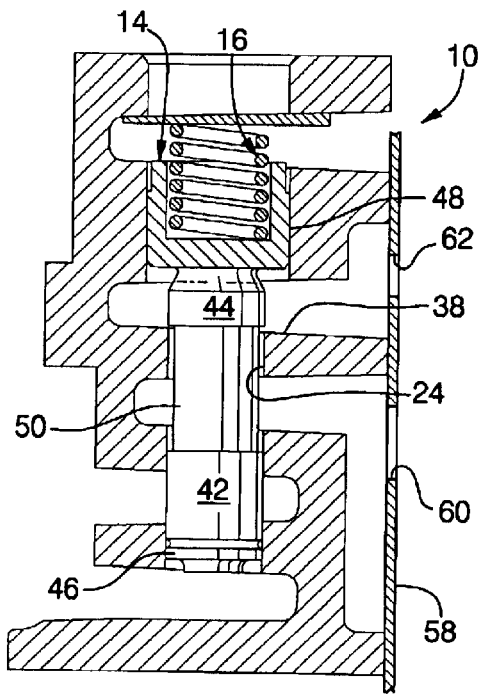
FIG. 7 is a view of the valve in a partial working position.

During clutch operation, the valve assembly 10 is initially moved to the position shown in FIG. 7 where the fluid pressure at the port 62 flows between the valve land 44 and the port 38, between the diameter portion 26 and the valley portion 50, and out the diameter portion 24 and the passage 60. This is the initial operating or engagement condition for the clutch, which is attached to the passage 60. The fluid pressure in passage 62 is controlled to an on/off condition essentially, that is, a low pressure and a controlled engagement pressure condition. The pressure in passage 62, when desired to operate the clutch, engages the differential area between the land 48 and the land 44. The pressure in this area operates to move the valve spool 14 against the spring 16, thereby opening the port 38 to the diameter portion 24.

Figure 8:
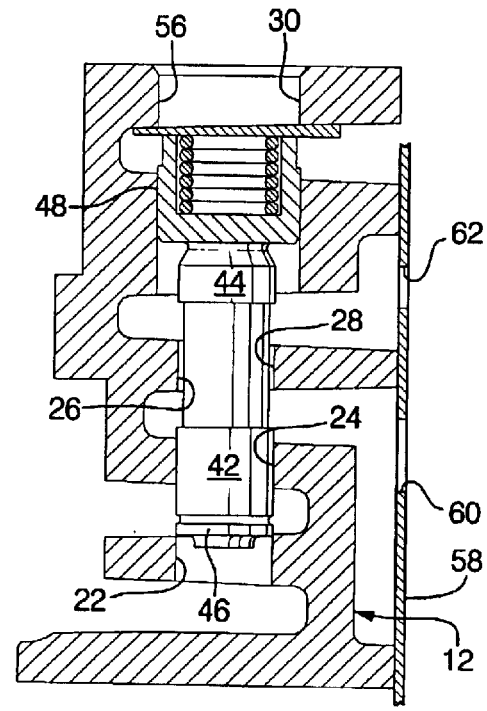
FIG. 8 is a view of the valve fully opened during working conditions.

The valve assembly 10 continues to open and is fully opened as shown in the position at FIG. 8. The valve is held open by fluid pressure operating on the differential area between the land 44 and the land 48. In this condition, the fluid flows freely from the port 62 to the port 60, thereby providing maximum engagement pressure for the clutch. In a typical valve, as that shown here, the spring 16 will have an assembled load in the range of 1.6 to 1.2 pounds. Those skilled in the art will recognize that this is not a significant load on the valve spool 14; therefore, any burr formed on the leading edge of the valve spool could inhibit the closing of the valve, thereby leaving the clutch in a fully or at least partially engaged condition. This condition, of course, leads to disruption of proper power transmission.

The pressure on the differential area between land 44 and land 48, for maximum operation or opening of the valve, is generally in the range of 8 psi to 10.3 psi. Those skilled in the art again will recognize that this opening of control pressure is very low compared to the full operating pressure of the valve assembly. Thus, if the valve is sticky due to a burr on the leading edge, the proper timing of the valve will also not occur. If the valve opening is delayed, the proper engagement timing of the clutch will be delayed, thereby leaving a ratio interchange within the transmission that will not be acceptable to the operator.

It should now be apparent that the reduced diameter of the protection land 46 inhibits or prevents an occurrence of some of the physical disruptions that may occur during valve operation, thereby improving overall operation of the transmission control system in which the valve is to be installed.

What is claimed is:

1. A valve assembly comprising:

a valve body including a valve bore and a plurality of fluid passages substantially perpendicular to and intercepting said valve bore;

a valve spool slidably disposed in said valve bore having a plurality of land portions with sealing diameters, at least one valley portion between adjacent land portions, a leading land portion formed on a first end of said valve spool having a diameter smaller than said sealing diameter on a first land, adjacent thereto in a range of 0.34 mm to 0.17 mm and being a non-sealing land and a recess formed between said leading land and said first adjacent land, said recess having an inner diameter at least 0.75 mm less than said diameter of said leading land to provide non-flow related debris collecting means; and a spring disposed between said valve spool and a spring retaining member at a second end of said valve spool to urge the valve spool into the valve bore.

2. The valve assembly defined in claim 1 further wherein:

said spring force represents a pressure to open said valve in the range of 8 psi to 10.3 psi.

3. The valve assembly defined in claim 1 further wherein:

said spring imposing a force in the range of 1.2 to 1.6 pounds when said valve spool is fully extended into said valve bore.

* * * * *